Feb. 11, 1958 A. BOTTING 2,822,851
TIRE CHAIN
Filed Sept. 13, 1954
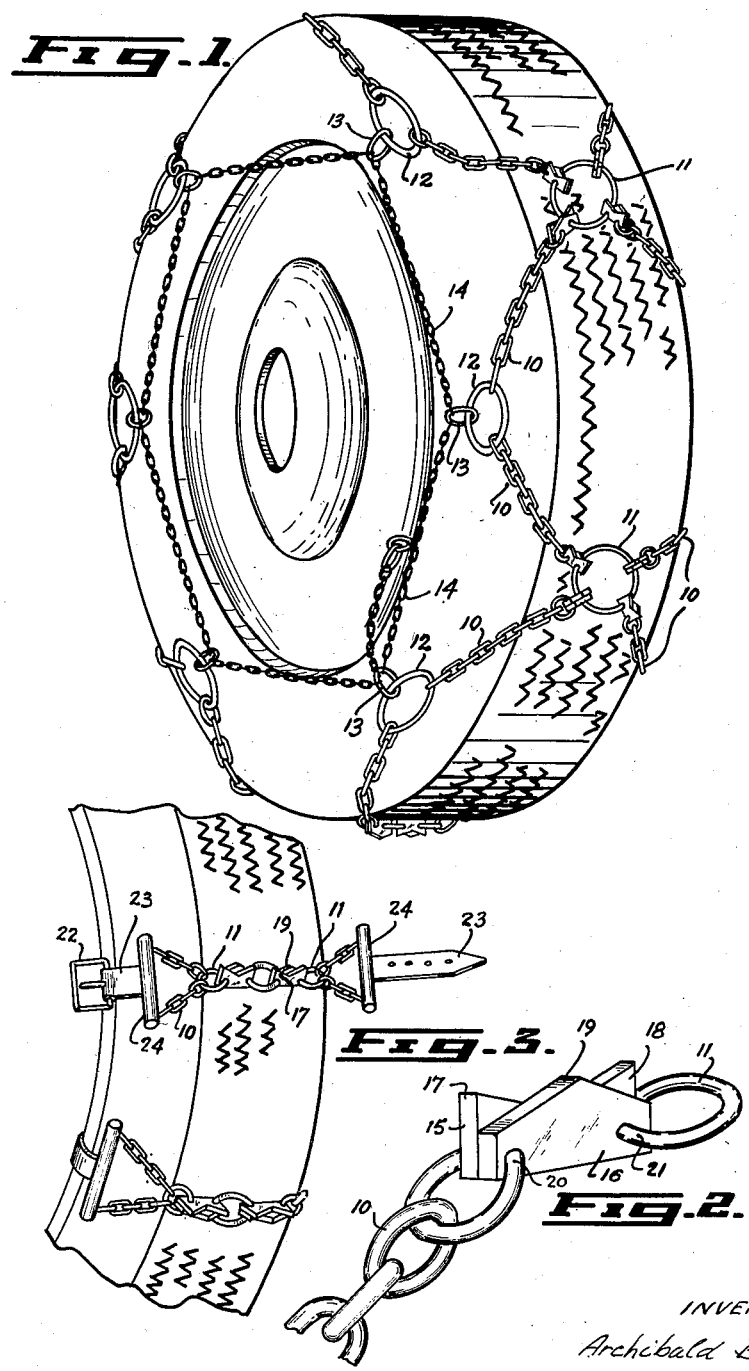
INVENTOR:
Archibald Botting
By Bailey Stephens & Huettig

2,822,851

TIRE CHAIN

Archibald Botting, Kingston, Ontario, Canada

Application September 13, 1954, Serial No. 455,506

5 Claims. (Cl. 152—244)

This invention relates to traction devices for vehicle wheels and in particular to tire chains for automobile wheels.

Tire chains as they are commonly used today have the disadvantage of presenting nothing but a chain surface to the road. This gives the extra traction needed if the road surface is soft or relatively so such as when it is covered by snow. The chains, however, will have little beneficial effect if the road surface is hard such as is the case when it is covered with ice.

It is an object of this invention to provide tire chains for automobiles which will present sharp, pointed projections to the road surface so that the chains will grip on ice as well as on softer snow.

It is a further object of this invention to provide tire chains with such gripping means that are simple and economical to manufacture.

It is a still further object of this invention to provide tire chains for automobiles which will grip on snow or ice and yet will not be injurious to the tires.

According to the present invention a tire chain which fulfills the above objects comprises chains crossing the tread of a tire and being joined together by links spaced around the periphery of the tire, outwardly projecting pointed connecting means being disposed between said links and said means.

By way of illustration, an embodiment of the invention will now be described in detail with reference to the accompanying drawings in which:

Figure 1 is a perspective view of the device in position on a tire.

Figure 2 is a perspective detail view of a portion of Figure 1 showing the road engaging means.

Figure 3 is a perspective view of a second embodiment of the invention.

Referring now to Figure 1, it will be seen that chains 10 are arranged in groups of four to form X-shaped patterns, the point of intersection of the arms of the X lying on the tread of the tire. At the point of intersection the chains 10 are secured to a connecting link 11. The outer ends of adjacent chains 10 of adjacent groups are joined to connecting rings 12, thus securing the whole assembly together. Smaller rings 13 are looped through rings 12 and through rings 13 passes a smaller chain 14. Chain 14 is separable and serves to release or secure the entire chain unit to the tire. It will be noted that the assembly is identical, on the side of the tire which is not visible in the drawings, to the side that is visible.

Between the chains 10 and the links 11 lie the road engaging members 15 and 16. Seen in Figure 2 the members 15 and 16 when in position present three sharp points to the road surface to prevent skidding on ice. The member 15 has a V-shaped notch centrally disposed on one side which leaves two points 17 and 18 projecting, one at each end. The surface of member 16 has its surface sloping towards a single central point 19. Holes 20 and 21 are provided passing through both members 15 and 16 so that a link of chain 10 can pass through hole 20 and link 11 through hole 21, thus holding members 15 and 16 in side by side relationship with the points projecting radially of the wheel. The relatively large link 11 lying flat against the tread of the tire prevents the members 15 and 16 from turning over and damaging the tire with their points. The bottom sides of members 15 and 16 are quite flat to avoid damage to the tire.

In Figure 3 is shown an embodiment of the invention in which all the road gripping advantages of the device are present in a chain of the emergency type. This chain is more commonly used in city driving where the chains are not needed at all times, and where it is convenient to remove them when they are not required.

This embodiment of the invention comprises the two pointed members 15 and 16, rings 11 and chains 10 as above.

There are two chains 10 secured to each ring 11 and each of these chains is spread apart by a bar 24 which serves to secure it to one part of a strap 23 having a buckle 22. By this means the devices may be secured about the tire in the usual manner, the bars 24 ensuring that the pointed members 15 and 16 project outwardly from the tire and do not turn sideways.

I claim:

1. A traction device for a vehicle wheel comprising chains crossing the tread of said wheel and being joined together by connecting links spaced along said tread, road engaging means positioned between said connecting links and said chains, each of said road engaging means comprising a pair of members, one of said members having a V-shaped notch therein, the other of said members having a central point, said members co-operating to present three outwardly projecting points when placed in side by side relationship, pairs of co-operating holes passing through said members for the insertion of a chain link and a connecting link.

2. A traction device for a vehicle wheel comprising a circular length of chain on each side of said wheel concentric with the rim of said wheel, shorter sections of chain length joined to said circular length of chain and extending across the tread of said wheel at spaced intervals around the periphery thereof, said sections of chain being joined to one another at spaced intervals around said tread by connecting links, secondary connecting means between said sections of chain and said connecting links, each of said secondary connecting means comprising a pair of members, one of said members having a V-shaped notch therein, the other of said members having a central projection, said members co-operating to present three outwardly projecting projections when placed in side by side relationship.

3. A traction device for a vehicle wheel comprising chains crossing the tread of said wheel and being joined together by connecting links spaced along said tread, road engaging means joining said connecting links and said chains, each of said road engaging means comprising a pair of co-operating members, one of said members having a point centrally disposed on one of its sides, the other of said members having a V-shaped notch centrally disposed on its corresponding sides, said two members presenting three outwardly projecting points when placed in side by side relationship, pairs of co-operating holes passing through both of said members for the insertion of a chain link and a connecting link.

4. A traction device for a vehicle wheel comprising a circular length of chain on each side of said wheel concentric with the rim of said wheel, shorter sections of chain joined to said circular length of chain and lying across the tread of said wheel at spaced intervals around the periphery thereof, said sections of chain being joined to one another at spaced intervals of the said tread by connecting links, secondary connecting means between said sections of chain and said connecting links, each of said secondary connecting means comprising a pair of cooperating members, one of said members having a projection centrally disposed on one of its sides, the other of said members having a V-shaped notch centrally disposed on its corresponding side, said two members presenting three outwardly projecting projections when placed in side by side relationship.

5. A traction device for a vehicle wheel comprising a chain positioned across the tread of said wheel, said chain being in two or more portions joined by connecting means, said connecting means including at least two road engaging members, said road engaging members being in side by side relation, alternate members being centrally notched and said members adjacent said notched members being centrally pointed on their outwardly projecting sides whereby said members together present a series of staggered outwardly projecting road engaging points, said members being perforated adjacent each end to receive links of said chain portions.

References Cited in the file of this patent

UNITED STATES PATENTS

| | | |
|---|---|---|
| 1,065,214 | Carter | June 17, 1913 |
| 1,319,512 | Clerico | Oct. 21, 1919 |
| 1,593,694 | Davis | July 27, 1926 |
| 1,670,528 | Carpenter | May 22, 1928 |
| 1,733,871 | Frank | Oct. 29, 1929 |
| 2,065,638 | Blum | Dec. 29, 1936 |

FOREIGN PATENTS

| | | |
|---|---|---|
| 1,006,403 | France | Jan. 23, 1952 |